United States Patent [19]

Cyb

[11] Patent Number: 4,930,678
[45] Date of Patent: Jun. 5, 1990

[54] HEAT-RESISTANT EXHAUST MANIFOLD AND METHOD OF PREPARING SAME

[76] Inventor: Frederick F. Cyb, 23351 Filmore, Taylor, Mich. 48180

[21] Appl. No.: 275,949

[22] Filed: Nov. 25, 1988

[51] Int. Cl.⁵ .............................................. B23K 31/02
[52] U.S. Cl. .................................. 228/176; 181/245; 181/240
[58] Field of Search .......... 228/125, 176, 199; 29/527.2, 527.3, 527.4; 181/240, 245, 256, 244, 282; 123/668, 669

[56] References Cited

U.S. PATENT DOCUMENTS

| | | | |
|---|---|---|---|
| 3,087,240 | 4/1963 | Gross | 29/527.2 |
| 3,233,697 | 2/1966 | Slayter et al. | 181/245 |
| 3,283,847 | 11/1966 | Kerns et al. | 181/245 |
| 3,838,495 | 10/1974 | Kuhnert | 29/527.2 |
| 4,113,167 | 9/1978 | Komiyama et al. | 228/176 |
| 4,612,880 | 9/1986 | Brass et al. | 123/669 |
| 4,674,594 | 6/1987 | Jensen | 181/282 |

*Primary Examiner*—M. Jordan
*Attorney, Agent, or Firm*—Arnold S. Weintraub; William D. Blackman

[57] ABSTRACT

A method of lining an exhaust manifold is disclosed, including applying a thin layer of a heat-resistant compound to the interior of an exhaust manifold; and bonding the compound to the manifold. The manifold may be in two or more sections when the compound is applied and the sections may subsequently be joined together to form the manifold. The compound may contain zirconium and/or may be a ceramic material.

11 Claims, 1 Drawing Sheet

U.S. Patent
Jun. 5, 1990
4,930,678
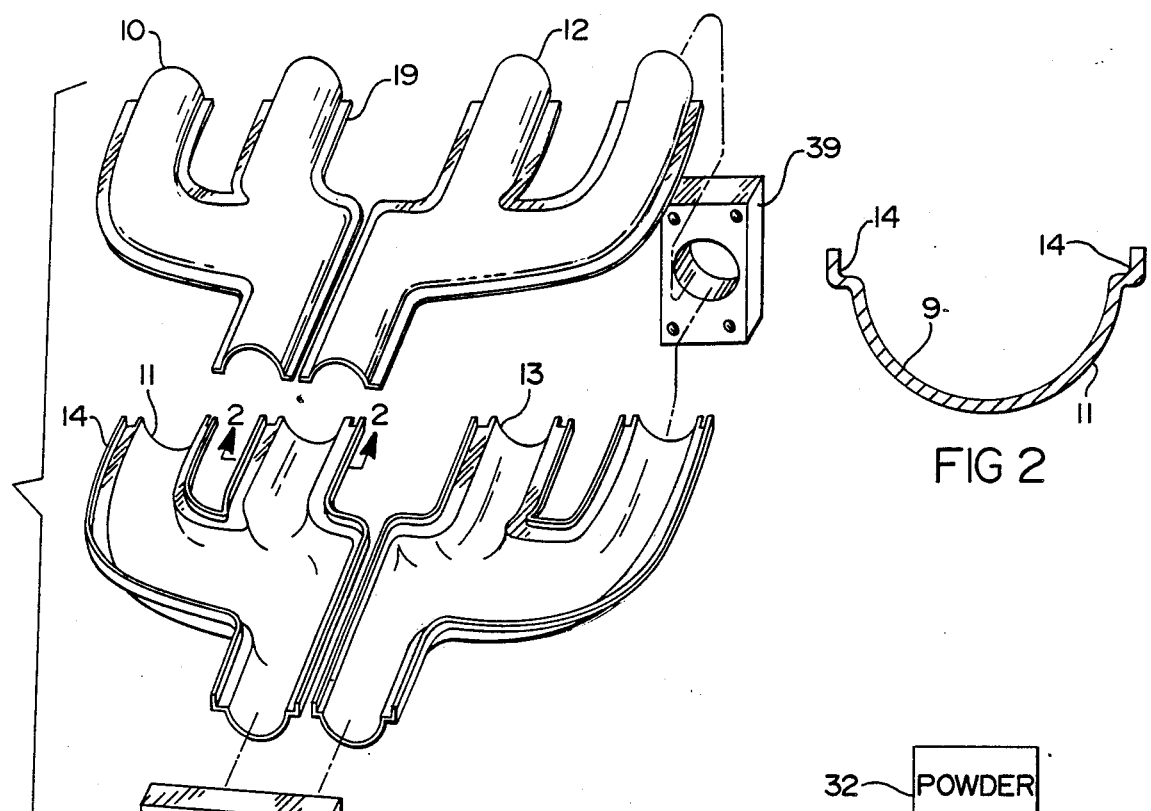
FIG 1
FIG 2
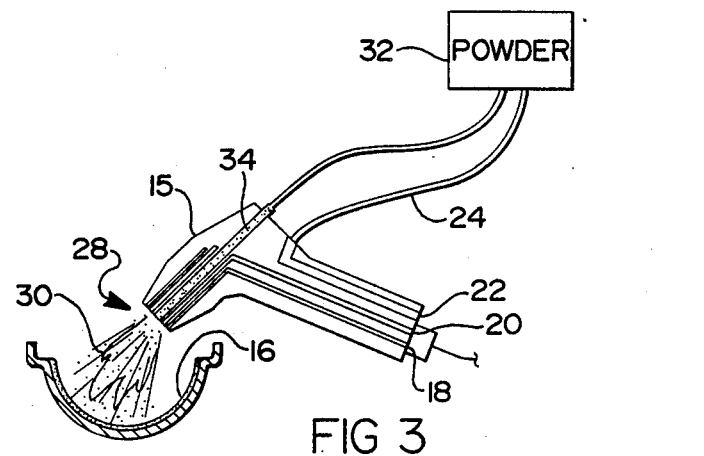
FIG 3
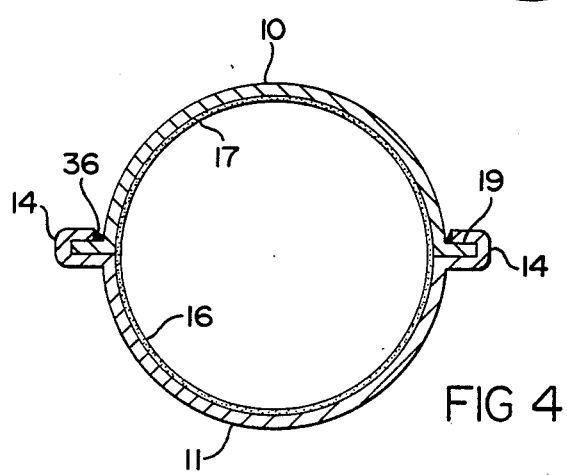
FIG 4
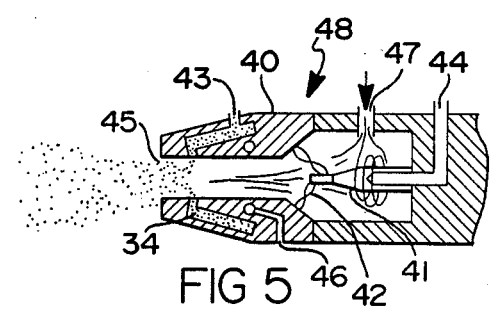
FIG 5

HEAT-RESISTANT EXHAUST MANIFOLD AND METHOD OF PREPARING SAME

BACKGROUND OF THE INVENTION

1. Field of the Invention

The present invention relates to heat-resistant exhaust manifolds and methods of preparing such manifolds. More particularly, the present invention relates to a method of lining an exhaust manifold with a heat-resistant compound containing zirconium, a ceramic material, or both, and a heat-resistant manifold which is the product of the described process.

2. Prior Art

In the automotive industry, it has long been recognized that heat generated by the combustion process emanating from the exhaust manifolds into the engine compartment of a vehicle is a problem. Not only does such heat degrade the various components in the engine compartment which are not heat resistant, but the heat also causes the exhaust manifolds themselves to become brittle and deteriorate. The problem is exacerbated in today's smaller engine compartments since cars are being "down-sized", especially when a high-performance engine is packed tightly into such a small engine compartment, e.g., a turbocharged or supercharged engine. Heat loss from exhaust manifolds is not limited to such high-performance engines, however.

Many varied types of heat shields and insulation have been employed in the prior attempts to alleviate this problem. Ongoing efforts continue to channel the maximum possible amount of heat which has been generated in the combustion chambers, from the exhaust ports of the cylinder heads out into and through the exhaust system, minimizing the amount which is released in the engine compartment.

Another reason for wishing to channel the maximum amount of heat possible through the exhaust system is that by retaining heat in the exhaust system, "light off" of the catalytic converter may be achieved sooner if more heat is conveyed directly to the converter. This promotes greater fuel efficiency as well as lowered exhaust emissions, which are both high priorities in today's market.

SUMMARY OF THE INVENTION

The present invention provides a method of lining an exhaust manifold, comprising the steps of:
 (a) applying a heat-resistant compound to form a first liner on the inside of a first sheet/metal shell, the first shell comprising a first section of an exhaust manifold;
 (b) bonding the first liner to the first shell;
 (c) applying a heat-resistant compound to form a second liner on the inside of a second sheet-matal shell, the second shell comprising a second section of the exhaust manifold and being alignable with the first section;
 (d) bonding the second liner to the second shell; and
 (e) joining the first and second shells together in an aligned configuration to form an exhaust manifold or a portion thereof.

The manifold may be in two or more sections when the compound is applied thereto, and the parts may be welded or otherwise joined together after the compound has been bonded to the manifold. The compound may be applied in a molten state and may be bonded to the manifold by the application of heat thereto. The compound may be a ceramic material, may contain zirconium, or may contain both of these. The application of the compound and the heat binding may be performed substantially simultaneously. The surface to be coated may be treated to roughen the surface before the compound is applied, and in one embodiment the compound is applied in a layer about 10 to about 15 thousands of an inch in thickness.

The present invention also encompasses a heat-resistant manifold which is prepared by the process of the present invention. Further detail regarding preferred embodiments of the present invention may be found in the detailed description section. Throughout the following description and in the drawings, identical reference numbers are used to refer to the same or a similar component shown in multiple figures of the drawings, in which;

BRIEF DESCRIPTION OF THE DRAWINGS

FIG. 1 is an exploded perspective view of of an exhaust manifold in accordance with the present invention;

FIG. 2 is a cross-sectional view of the lower section of the manifold of FIG. 1; taken along the line 2—2;

FIG. 3 is a view similar to FIG. 2 showing a heat-resistant compound being applied to the interior of the manifold;

FIG. 4 is a cross-sectional view of a section of the assembled manifold showing a liner formed of heat-resistant material on the inside thereof.

FIG. 5 is a cross-sectional view of the head of a plasma-arc spray gun, partially cut away.

DETAILED DESCRIPTION OF THE PREFERRED EMBODIMENT

Referring to FIG. 1, four sections of an exhaust manifold body are illustrated, along with additional components of the manifold. The additional components shown are a first flange 38 for the attachment of an exhaust pipe, and a machined plate 39 having holes therein for attachment to a cylinder head of an automotive engine, and may be added to this manifold body once the heat resistant compound has been bonded thereto and the component parts have been joined together. The additional components may be attached to the manifold body by laser welding, tig welding, or other suitable method. Additional plates similar to 39 would be used to complete the manifold of FIG. 1.

The manifold illustrated in FIG. 1 comprises a pair of upper sections 10, 12 including a first section 10 of a manifold which is a first sheet metal shell. The manifold of FIG. 1 also includes a pair of lower sections 11, 13 of a manifold including a second section 11 which is a second sheet metal shell. The first and second sections 10, 11 are alignable as may be seen in FIG. 1.

As shown in FIG. 2, the second section 11 has a ridge 14 formed on each side of the shell 11 for joining the sections 10, 11 together as will be described herein.

Referring to FIG. 3, a metal spraying gun 15 is illustrated in cross-section, applying a thin heat-resistant layer to the inside of the shell 11 forming a liner 16 on the inside thereof. In a metal spraying application a suitable fuel mixture, such as hydrogen, acetylene, or acetylene and oxygen is fed into a fuel inlet 20 of the metal-spraying gun 16 from a fuel source (not shown). Air is fed into an air port 18 of the gun 15, and mixes with the fuel at the outlet 28 of the gun. The fuel is ignited to form a flame front 30 at the outlet of the gun.

Drive air is applied to a drive air port 22 and passes through a drive air conduit 24 to force a compound in the form of a powder out from a reservoir 32 and into a powder conduit 26 and thence into the gun 15. The compound 34 is sprayed outwardly from the gun in a conical pattern and is bonded to the inside of the sheet metal shell 11 to form a first liner 16 on the inside thereof.

The interior surface 9 of the sheet metal shell 11 may be roughened beforehand to promote bonding to the surface 9, such as by sandblasting, machining, or other appropriate method. Alternatively, any appropriate adhesive may be applied to the inner surface 11 of the sheet metal shell to promote bonding of the compound 34 to the inside surface 9 of the sheet metal shell 11.

As seen in FIG. 5, an alternate means of applying the compound 34 to the sheet metal shells is plasma-arc spraying. In plasma-arc spraying, a gas such as nitrogen or argon is fed into a plasma spray gun at a gas inlet 47 and passed between two electrodes 40, 41 where it is ionized by a continuous high voltage arc 42 passing between the electrodes. This ionizes the gas and forms it into a plasma capable of attaining temperatures of 20,000° F. or more. The electrodes 40, 41 are normally liquid cooled by cooling ports 46, 44 to prolong their life. A powder 34 which is used to form the heat-resistant liner 16 is fed into the gun 48 at a powder inlet 43 and enters the plasma downstream of the arc 42 where it is melted by the plasma and is caught up therein and sprayed from the outlet 46 of the gun 48 and applied to the inside of the manifold sections 10, 11, 12, 13. Plasma-arc spraying is relatively well known and understood in the art.

The compound 34 which is used to form the liner may contain zirconium, may be a metallic alloy or a ceramic material or may be a powdered glassy compound such as zircon. These compounds are used because of their known heat-resistant properties. The liner 16 may be bonded to the interior 9 of the sheet metal shell 11 by the application of heat thereto. While the thickness of the liner 16 is not critical to the present invention, a thickness of about 0.010 inches to about 0.015 inches has been found to be helpful in promoting heat-resistance in the finished manifold. Each of the remaining sections 10, 12 and 13 of the manifold is treated in a similar fashion, and the gun 16 or 48 is used to spray a thin layer of the heat-resistant compound 34 on the insides thereof, which is bonded to the shells 10, 12, 13 to form similar liners.

Referring to FIG. 4, a cross-sectional view of part of the assembled manifold is illustrated with the upper section 10 joined to the lower section 12. The rib 14 of the lower section 11 is bent in a die (not shown) in two operations and is clamped around the ridges 19 of the sheet metal shell 10 and may be welded thereto as at 36 to insure that exhaust gas will not leak out of the manifold at the seams proximate the ridges 14. The ridges 14 thus provide a means for securing the first section 10 to the second section 12 in the aligned configuration. Alternative methods of joining the two sections 10, 11 may be used, as will be appreciated by those skilled in the art. The third and fourth sections 12, 13 are joined together in a similar fashion. The plates 38 and 39 are added on as shown in FIG. 1 and three additional plates similar to 39 would be used to complete the manifold of FIG. 1.

The foregoing description is intended to be illustrative, and not restrictive. Many modifications of the present invention will occur to those skilled in the art. All such modifications within the scope of the appended claims are intended to be within the scope and spirit of the present invention.

Having, thus, described the invention, what is claimed is:

1. A method of lining an exhaust manifold, comprising the steps of:
   (a) applying a heat-resistant compound to form a first liner on the inside of a first sheet-metal shell, the first shell comprising a first section of an exhaust manifold;
   (b) bonding the first liner to the first shell;
   (c) applying a heat-resistant compound to form a second liner on the inside of a second sheet-metal shell, the second shell comprising a second section of the exhaust manifold and being alignable with the first section;
   (d) bonding the second liner to the second shell; and then
   (e) joining the first and second shells together in an aligned configuration to form an exhaust manifold or a portion thereof.

2. The method of claim 1, wherein the compound is applied in a molten condition and is allowed to solidify in the shells.

3. The method of claim 2, wherein the compound is applied by plasma-arc spraying.

4. The method of claim 1, wherein the liners comprise a ceramic material.

5. The method of claim 1, wherein the liners comprise zirconium.

6. The method of claim 1, wherein the steps are performed substantially simultaneously.

7. The method of claim 1, further comprising the step of roughening the interiors of the shells prior to applying the compound.

8. A heat-resistant exhaust manifold which is a product of the method of claim 1.

9. The manifold of claim 8, wherein the liners comprise zirconium.

10. The manifold of claim 8, wherein the liners comprise a ceramic material.

11. A heat-resistant exhaust manifold, comprising:
    (a) a first section of a manifold body formed in a sheet metal shell;
    (b) a second section of a manifold body formed in a sheet metal shell and being alignable with the first section;
    (c) a thin liner for each of the first and second sections, the liners bonded to the respective sections; and
    (d) means for securing the first section to the second section in an aligned configuration.

* * * * *